April 28, 1959  G. LIEBMANN  2,884,193
ELECTRICAL ANALOGUE-COMPUTING APPARATUS
Filed Sept. 22, 1953
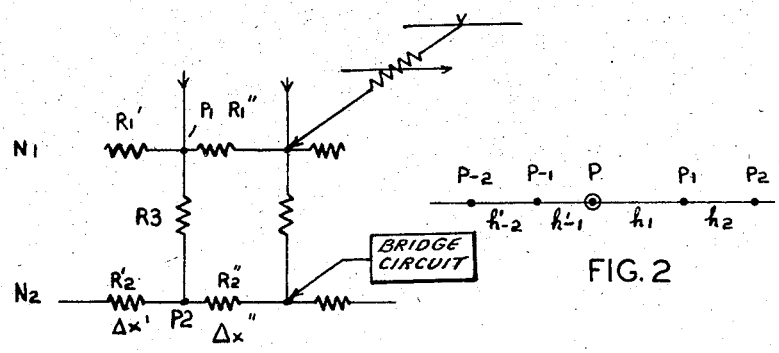
FIG 1
FIG. 2
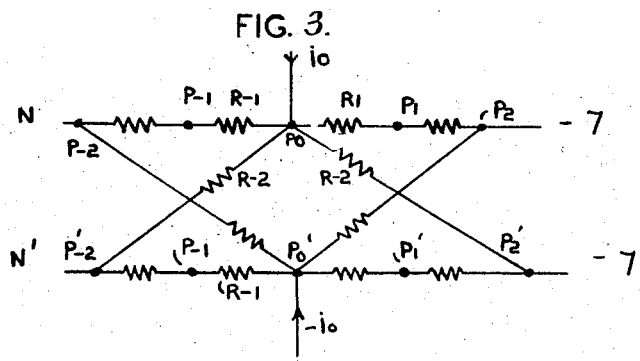
FIG. 3.
INVENTOR
Gerhard Liebmann
By Morris & Bateman
ATTORNEYS United States Patent Office 2,884,193
Patented Apr. 28, 1959

2,884,193

ELECTRICAL ANALOGUE-COMPUTING APPARATUS

Gerhard Liebmann, Aldermaston, England, assignor to Sunvic Controls Limited, London, England, a company of Great Britain Application September 22, 1953, Serial No. 381,588

Claims priority, application Great Britain October 2, 1952

4 Claims. (Cl. 235—184)

This invention relates to electrical analogue computing apparatus of the kind in which a physical problem is represented by an electrical network.

The invention has an important application in determining the resonant frequencies of shafts and other rotating apparatus.

The main object of the invention is to provide improved apparatus which may be employed for solving such problems.

The present invention comprises an analogue resistance network including a pair of resistance chains, each chain having related junction points corresponding to position points in the material or body under examination and resistances interconnecting related junction points in the two chains, which resistances are chosen to represent the physical properties of the material at the locality in question, together with means for feeding currents of adjustable value to the junction points of one resistance chain and means for determining the resulting potentials at the junction points in the other resistance chain, the arrangement being such that by iteratively adjusting the currents until the potentials and currents bear a constant relation a physical problem may be solved.

In applying the invention to the determination of the resonant frequencies of a rotating shaft or the like the currents ($i$) fed to the junction points of the first chain would be varied iteratively until the resulting potentials ($y$), representing deflection at the junction points of the second chain bear a constant ratio and thereby satisfy the expression $$\omega^2 = k\left(\frac{i_1}{y}\right)$$

In order that the invention may be more clearly understood reference will now be made to the accompanying drawings, in which:

Fig. 1 shows the general arrangement of the network,
Fig. 2 is a theoretical figure explanatory of Fig. 1.
Fig. 3 is a modification of Fig. 1 showing a section of a "ladder" type network.

The invention will be described with reference to the differential equation describing the resonance frequencies of a "whirling shaft"; by way of illustration:

$$\frac{d^2}{dx^2}\left(EI\frac{d^2y}{dx^2}\right) = m\omega^2 y \tag{1}$$

in which $x$ is the independent variable (position along the shaft), $y$ the deflection of the shaft, $E$ is Young's modulus, $I$ the moment of inertia about the axis, $m$ the weight of the shaft per unit length, and $\omega$ the angular velocity. The differential Equation 1 has non-trivial solutions for certain discrete "characteristic" values of $\omega$, the so-called "critical speeds."

The solution of Equation 1 is effected by replacing the differential equation by its equivalent finite difference equation and then constructing an impedance network which will represent the difference equation, the network voltages representing the displacement $y$. As $(EI)$ and $m$ are, as a rule, functions of the independent variable $x$, the values of the impedances used in the network will not be the same throughout but will depend on the relative positions of the impedances within the network. Moreover the "whirling shaft" is often supported by a number of bearings, which may be spaced irregularly, so that it is necessary to consider network intervals of unequal lengths.

The "cascaded" network of Fig. 1 consists of two similar resistance strips $N_1$ and $N_2$, of which the corresponding or related junctions $P_1$ and $P_2$ are connected by resistances $R_3$. If the finite difference intervals on the two sides of the network nodes $P_1$ and $P_2$ respectively are $\Delta x'$ and $\Delta x''$, the values of the resistances in network strip $N_1$ are $$R_1' = a_1 \Delta x' R_0 \tag{2}$$
$$R_1'' = a_1 \Delta x'' R_0$$

etc., and similarly in network strip $N_2$ $$R_2' = a_2 \Delta x' R_0 \tag{3}$$
$$R_2'' = a_2 \Delta x'' R_0$$

etc. That is the network resistances in $N_1$ and $N_2$ are proportional to a basic resistance value $R_0$ (a constant) and to the interval length $\Delta x$ between successive nodes; they are further proportional to a scaling constant "$a_1$" for network $N_1$ and a scaling constant "$a_2$" for network $N_2$. In practice one chooses very often $a_1 = a_2$, with a numerical value of $a_1 = 1$, its "dimension" being $L^{-1}$. By substituting the appropriate difference expressions, using the unequal intervals $\Delta x'$ and $\Delta x''$, for the second derivatives in Equation 1, then replacing $\Delta x'$ and $\Delta x''$ with the help of Equations 2 and 3 and applying Kirchhoff's law to the network junctions $P_1$ and $P_2$, one can establish that the network arrangement of Fig. 1 solves the difference equation equivalent to the differential Equation 1 if the resistance $R_3$ is given this value:

$$R_3 = \frac{b(EI)R_2}{(\Delta x')(\Delta x'')} \tag{4}$$

and this current $i_1$ is fed into the network junction $P_1$:

$$i_1 = \frac{bm\omega^2 y(\Delta x')(\Delta x'')}{R_1} \tag{5}$$

in which $\omega$ and $y$ are variables and the remaining terms are constants, with $$R_1 = \frac{2R_1'R_1''}{R_1' + R_1''} \tag{6}$$

and $$R_2 = \frac{2R_2'R_2''}{R_2' + R_2''} \tag{7}$$

Equation 5 may also be expressed as $$\omega^2 = \frac{i_1}{y} \times \text{constant.}$$

The constant "$b$" in Equation 5 is a scaling constant, chosen to be of such magnitude that $R_3 \gg R_2$ and $R_3 \gg R_1$. The appropriate choice of the numerical value of $b$ is a matter of compromise; too small a value of $b$ leads to an interaction of networks $N_1$ and $N_2$, and invalidates the assumptions under which the arrangement gives a correct solution of (1), whereas too great a value of $b$ reduces the signal level on network $N_2$ to an undesirable degree. The "dimension" of $b$ is $M^{-1} L^{-1} T^2$. The values of $m$ and $(EI)$ to be used in Equations 4 and 5 are the average values over the interval $(\Delta x' + \Delta x'')$. The voltages appearing in the network $N_1$ represent then the (negative) bending moments of the shaft, and the voltages in $N_2$ represent the displacements $y$ of the shaft. The actual solution of the problem of finding the critical speeds $\omega_1, \omega_2, \ldots$, once the model has been set up by the appropriate choice of the values of the resistances $R_1'$, $R_1''$, ... $R_3$ for each network position, proceeds in a manner similar to one described previously (see Liebmann, I.E.E. Monograph No. 38), by feeding in currents $i_1$ at network points $P_1$, measuring the voltages at network points $P_2$, and then readjusting the currents $i_1$ cyclically until a "self-consistent" voltage and current distribution, satisfying everywhere Equation 5 with the same value of $\omega$, has been established. The speed of this iteration process is greatly increased if the display apparatus forming the subject of U.S. application Serial No. 376,166, filed August 24, 1953, now Patent No. 2,846,141, is used to display for each point the residual error current $$\frac{d^2}{dx^2}\left(EI\frac{d^2y}{dx^2}\right) - m\omega^2 y = \rho$$

The "critical" frequency obtained is always the lowest possible value for the given boundary conditions; the higher "critical" frequencies are found by fixing intermediate nodal positions, for which $y=0$, and shifting these along until the $\omega$ values for all sections of the shaft are identical.

With reference to the explanatory diagram Fig. 2, showing the points $P_{-2}, \ldots P_2$ along the shaft, with intervals $h_{-2}, h_{-1} \ldots h_2$ between successive points, the difference expression for $$\frac{d^2}{dx^2}\left(EI\frac{d^2y}{dx^2}\right)$$

can be written in this form:

$$\left[\frac{d^2}{dx^2}\left(EI\frac{d^2y}{dx^2}\right)\right]_0 \simeq \left(\frac{4}{h_1+h_{-1}}\right)\left\{\frac{(EI)_1(y_2-y_0)}{(h_1+h_2)h_1h_2}\right.$$
$$-\left(\frac{(EI)_1}{h_2}+\frac{(EI)_0}{h_{-1}}\right)\frac{(y_1-y_0)}{h_1^2}$$
$$-\left(\frac{(EI)_{-1}}{h_{-2}}+\frac{(EI)_0}{h_1}\right)\left(\frac{y_{-1}-y_0}{h_{-1}^2}\right)$$
$$\left.+\frac{(EI)_{-1}(y_{-2}-y_0)}{(h_{-1}+h_{-2})h_{-1}h_{-2}}\right\} \quad (8)$$

In this expression, the suffixes 0, 1, ... refer to the values at points $P_0, P_1$ ... The resistances have values given by the following expressions, $R_0$ being a suitably chosen reference value of resistance (an apparatus constant), and "$c$" a scaling constant of "dimension" $M T^{-2}$:

$$\left.\begin{array}{l} R_{1,\ 0} = \dfrac{ch_1^2 R_0}{B_1/h_2 + B_0/h_{-1}} \\[6pt] R_{-1,\ 0} = \dfrac{ch_{-1}^2 R_0}{B_{-1}/h_{-2} + B_0/h_1} \\[6pt] R_{2,\ 0} = -\dfrac{ch_1 h_2(h_1+h_2)R_0}{B_1} \\[6pt] R_{-2,\ 0} = -\dfrac{ch_{-1}h_{-2}(h_{-1}+h_{-2})R_0}{B_1} \end{array}\right\} \quad (9)$$

A network for the solution of differential Equation 1 based on the difference Equation 8, but using only "positive" resistances will now be described with reference to Fig. 3, showing a section of the network near point $P_0$. This network consists of two identical resistance strips N and N', the two resistance strips being interconnected in the manner shown by further resistances. In operation, always voltages (or currents) identical in value but opposite in sign are applied to resistance strips N and N' respectively. This can be achieved easily, e.g. by feeding voltages or currents from the terminals of a transformer, which give voltages $+V$ and $-V$ with reference to the common zero point of the network, and providing duplicate, ganged controls, one of each pair working from $+V$ and co-operating with resistance strip N, and the other of each pair working from $-V$ and co-operating with resistance strip N'.

By a rearrangement of the terms in Equation 8 one can show that the network of Fig. 3 solves the difference equation replacing the differential Equation 1, if the resistances $R_{1'0}$ and $R_{-1'0}$ in resistance strips N and N' have the same values as the resistances $R_{1'0}$ and $R_{-1'0}$ specified by Equation 9, and the interconnecting resistances $R_{2'0}$ and $R_{-2'0}$ have the values of resistances $R_{2'0}$ and $R_{-2'0}$ respectively as specified in Equation 9, provided that the currents $i_0$ and $-i_0$ are fed into the network points $P_0$ on N and $P_0'$ on N', the current $i_0$ being given by:

$$i_0 = \left[\frac{2B_1}{(h_1+h_2)h_1h_2} + \frac{2B_1}{(h_{-1}+h_{-2})h_{-1}h_{-2}} \right.$$
$$\left. +\frac{(h_1+h_{-1})m_0\omega^2}{4}\right]\frac{y_0}{cR_0} \quad (10)$$

For actual working purposes, this relation can be replaced by:

$$i_0 = (\alpha + \beta\omega^2)y_0 \quad (11)$$

where $\alpha$ and $\beta$ are local constants given by the geometry of the shaft. The actual solution of the problem described by the differential Equation 1 is then carried out by applying the beforementioned iteration process until the distribution of all voltages $y_0$ and all currents $i_0$ is such that Equation (11) is satisfied at all points for the same value $\omega$, which is the "critical" speed.

Finite deflections at the bearings of the shaft can be taken into account by introducing the appropriate terms into differential Equation 1, and consequently into the "working equation" (11). Also other problems, like bending of shafts of varying cross-section under load, etc., which lead to differential equations of a type similar to Equation 1, can be solved by the various networks described in this patent application with the appropriate modifications to the currents fed in according to Equations 5 or 11.

What I claim is:

1. An electrical analogue impedance network representing the mathematical equivalent of a physical problem capable of representation as a fourth order differential equation and including a pair of impedance chains, each chain having junction points corresponding to successive position points along an axis of the material or body under examination, the interconnecting impedances being scaled so that the impedance chains represent the equation in finite difference form, resistances interconnecting the junction points at the two impedance chains, means for feeding currents of variable value to the junction points at the first impedance chain and means for observing the resulting voltages produced in the second impedance chain.

2. An electrical analogue resistance network representing the mathematical equivalent of a physical problem capable of representation as a fourth order differential equation, including a pair of resistance chains, each having junction points corresponding to successive position points along an axis of the material or body under examination, the interconnecting resistances being scaled so that the resistance chains represent the equation in finite difference form, resistances interconnecting the junction points of the two resistance chains, means for feeding currents of variable value to the junction points of the first resistance chain and means for observing the resultant voltages produced at the junction points of the second resistance chain.

3. An electrical analogue impedance network representing the conditions existing in a rotating shaft, including a pair of impedance chains each having junction points corresponding to successive position points along the shaft, the impedances interconnecting the junction points being scaled to represent the properties of the shaft in successive positions, resistances interconnecting junction points of the two impedance chains, means for feeding currents of variable value to the junction points of the first impedance chain in accordance with conditions existing at a given speed of rotation and means for observing the voltages produced at the junction points of the second chain to determine the resulting deflections of the shaft.

4. An electrical analogue impedance network representing the conditions existing in a rotating shaft, including a pair of impedance chains each having junction points corresponding to successive position points along the shaft, the impedances interconnecting the junction points being scaled to represent the properties of the shaft in successive positions, resistances interconnecting junction points in the first chain with junction points spaced in both directions along the second chain, means for feeding currents to the junction points of the first impedance chain in accordance with conditions existing at a given speed of rotation, and means for observing the voltages produced at the junction points of the second chain to determine the resulting deflections of the shaft.

References Cited in the file of this patent

UNITED STATES PATENTS

| | | |
|---|---|---|
| 2,461,738 | Johnson | Feb. 15, 1949 |
| 2,569,646 | Wade et al. | Oct. 2, 1951 |

FOREIGN PATENTS

| | | |
|---|---|---|
| 605,822 | Great Britain | July 30, 1948 |

OTHER REFERENCES

Terman: "Radio Engineer's Handbook," 1st ed., 1943, McGraw-Hill Book Co., Inc.